(12) United States Patent
Lee (10) Patent No.: US 7,669,681 B2
(45) Date of Patent: Mar. 2, 2010

(54) MOTORBIKE

(75) Inventor: Tae Geun Lee, Seoul (KR)

(73) Assignee: Eshim Tech. Co. Ltd., Seoul (KR)

( * ) Notice: Subject to any disclaimer, the term of this patent is extended or adjusted under 35 U.S.C. 154(b) by 282 days.

(21) Appl. No.: 11/587,833

(22) PCT Filed: May 14, 2005

(86) PCT No.: PCT/KR2005/001407

§ 371 (c)(1),
(2), (4) Date: Oct. 26, 2006

(87) PCT Pub. No.: WO2005/110839

PCT Pub. Date: Nov. 24, 2005

(65) Prior Publication Data

US 2008/0000708 A1    Jan. 3, 2008

(30) Foreign Application Priority Data

May 14, 2004    (KR) .................. 10-2004-0034093

(51) Int. Cl.
*B62M 7/00* (2006.01)
(52) U.S. Cl. .................................................. 180/221
(58) Field of Classification Search .......... 180/219, 180/221, 227
See application file for complete search history.

(56) References Cited

U.S. PATENT DOCUMENTS

| | | | | |
|---|---|---|---|---|
| 2,491,076 A * | 12/1949 | Benazzoli | .......... | 180/205 |
| 3,342,281 A * | 9/1967 | Elia | .......... | 180/208 |
| 4,502,560 A | 3/1985 | Hisatomi | | |
| 4,570,738 A | 2/1986 | Grinde et al. | | |
| 4,974,695 A * | 12/1990 | Politte | .......... | 180/221 |
| 5,069,304 A * | 12/1991 | Mann | .......... | 180/221 |
| 5,435,408 A | 7/1995 | Sekinobu | | |
| 6,065,557 A * | 5/2000 | von Keyserling | .......... | 180/221 |

OTHER PUBLICATIONS

PCT International Search Report for LUI for PCT/KR2005/001407, Filed May 14, 2005, Dated Sep. 12, 2005.

* cited by examiner

*Primary Examiner*—Kevin Hurley
(74) *Attorney, Agent, or Firm*—Volpe and Koenig, P.C.

(57) ABSTRACT

A motorbike whose driving force is enhanced and whose wheels are prevented from slipping is disclosed. The present invention includes a main body; an air suction section provided in the main body; a front rear wheel assembly provided in the front and rear side of the main body; a connection bar and a connection link; a brake mechanism constituted by a brake disc fixed to the rotation shaft of the main body and a caliper which presses portions of the brake disc to apply a braking force; and a controller constituted by an acceleration pedal and a braking pedal which are respectively connected to the engine and the brake mechanism through a flexible cable, the acceleration pedal and the braking pedal being hinge-joined to each other at one end thereof to control driving of the engine and braking of the rear wheel shaft, respectively.

7 Claims, 9 Drawing Sheets

MOTORBIKE

BACKGROUND OF THE INVENTION

1. Technical Field

The present invention relates to a motorbike (also referred to as 'wheelman'), and more specifically, to a motorbike which has an improved driving force and is capable of preventing slipping of wheels to provide a reliable braking force.

2. Description of the Related Art

As living standards have been improved, various kinds of leisure-sports goods are becoming popular, so that more people make use of their spare time and train their bodies.

Among them, there is provided a motorbike (also referred to as 'wheelman'). The motorbike is provided with front and rear wheel assemblies in the front and rear sides of a main body. The main body has an engine and a powertrain system mounted therein. In the respective sides of the front and rear wheel assemblies, front and rear stepping pedal are provided, on which user's feet are placed. Therefore, the external shape thereof has such a unique structure where the motorbike seems to be constituted by only two wheels.

However, in such a conventional motorbike, the driving force of the engine is transmitted to the powertrain system so that a rear wheel shaft of the rear wheel assembly is rotated to indirectly drive the rear wheel, which is referred to as the indirect driving system. Therefore, the driving force is not reliably transmitted to the rear wheel, and the loss of power such as the slipping of the rear wheel occurs, which means that there is a problem in that the driving force is not transmitted smoothly and the loss of power is great.

In addition, the conventional motorbike has a structure where the main body is inclined so that brake pads provided in the lower portions of the front and rear stepping pedals are brought into contact with the ground, thereby generating friction force to perform the braking operation. Therefore, the braking performance is significantly degraded and the brake pad is easily worn out, which can negatively effect the main body in various ways.

SUMMARY OF THE INVENTION

The present invention has been finalized in view of the drawbacks inherent in the related art, and a main object of the present invention is to provide a motorbike having the following features. A driving force of an engine is directly transmitted to a rear wheel of a rear wheel assembly, which is referred to as 'the direct driving of the rear wheel'. Therefore, the driving force can be enhanced, and power waste can be minimized. In addition, operability of the braking is drastically improved, so that the safety, when in use, is improved.

In addition, another object of the present invention is to provide a motorbike having the following advantage. By improving the flexibility and shock absorption, the riding quality is improved, and other various requirements can be satisfied.

DETAILED DESCRIPTION OF THE PREFERRED EMBODIMENTS

In order to achieve the above-mentioned object, a motorbike according to the present invention includes a main body that is provided with an engine mounted therein, a rotation shaft which is connected to an output shaft of the engine through a transmission so as to be rotatably disposed in the rear side, and a driving gear constituted by a pair of right and left discs fixed to the rotation shaft, and a plurality of bar bodies which are disposed in the circumferential direction of the pair of discs so as to connect one disc to the other disc; a front wheel assembly that is disposed in the front side of the main body to be constituted by a front wheel cover, a front wheel frame by which a plurality of guide rollers are rotatably supported therein, and a front wheel which is rotatably supported by the plurality of guide rollers; a rear wheel assembly that is disposed in the rear side of the main body to be constituted by a rear wheel cover, a rear wheel frame by which a plurality of guide rollers are rotatably supported therein, and a rear wheel which is rotatably supported by the plurality of guide rollers; front and rear stepping pedals provided to the front and rear wheel assemblies; a connection bar through which the rear wheel cover and the front wheel cover is connected in the longitudinal direction; a connection link through which the front wheel frame is connected to the lower portion of the main body; a brake mechanism that is fixed to the rotation shaft of the main body; and a controller that is connected to the engine and the brake mechanism through a flexible cable and in which an acceleration pedal and a braking pedal for controlling the driving of the engine and braking of the rear wheel shaft, respectively, are rotatably hinge-joined. On the outer circumferential surface of the rear wheel, a plurality of grooves are formed in the circumferential direction to correspond to the outer circumferential surfaces of the bar bodies of the driving gear, and as the grooves of the rear wheel and the bar bodies of the driving gear are brought into rotational contact with each other, the rear wheel is rotatingly driven.

Preferably, the brake mechanism fixed to the rotation shaft of the main body is constituted by a brake disc and a caliper which presses portions of the brake disc to apply braking power.

Preferably, the brake mechanism can be substituted by a brake drum fixed to the rotation shaft and a drum brake which presses portions of the brake drum to apply braking power.

The transmission in the direction of the output shaft of the engine is rotated and engaged with the rotation shaft which is connected through a transmission such as sprocket or pulley to be rotatably disposed in the rear side of the main body.

Preferably, the motorbike includes a first pulley mounted on the output shaft of the engine and a second pulley mounted on the rear shaft parallel to the output shaft. The driving gear is realized by use of a CVT system where the effective diameter of the first pulley is changed from a small one to a large one by the rotation and, corresponding to the change, the effective diameter of the second pulley is changed.

Preferably, the motorbike further includes a shock-absorbing spring member that is disposed on the shaft of the connection bar so as to provide a shock-absorbing force in the shaft direction of the connection bar.

The motorbike further includes an air suction section including an air inlet for sucking air from the outside to supply the air to the engine, a filter which is disposed in the downstream side of the air inlet to filter air to be sucked, and an adjusting damper for adjusting an amount of air to be flowed in the engine.

Preferably, in the connection link constituted by a first and a second connection links, one end of the first connection link is joined to the lower side of the main body and one end of the second connection link is joined to the frame of the front wheel assembly. The other ends of the first and the second connection links, which are adjacent to each other, are hinge-joined to each other so that the concentric portions thereof can turn, and on the other ends of the first and the second connection links, which are adjacent to each other, a guide groove formed at a predetermined rotation angle and a guide projection guided by the guide groove are provided so as to correspond to each other.

Preferably, the air inlet of the air suction section is disposed so as to face in the side of the rear wheel.

Hereinafter, a preferred embodiment of the present invention will be described in detail with reference to the accompanying drawings.

FIGS. 1 to 5 are diagrams illustrating a motor board according to an embodiment of the present invention.

As shown in the drawings, a motorbike of the present invention includes a main body 10 provided with an engine 11 therein, an air suction section 16 for sucking the outside air to supply to the engine 11, front and rear wheel assemblies 20 and 30 which are disposed in the front and rear side of the main body 10, a connection bar 41 for connecting the front and rear wheel assemblies 20 and 30, a connection link 50 for connecting the main body 10 and the front wheel assembly 20, a brake mechanism 60 attached to the main body 10, and a controller 70 for controlling the speed and a stop operation.

The main body 10 having the engine 11 mounted therein includes a rotation shaft 13, which is connected to an output shaft 12a of the engine 11 through a belt transmission 12 such as a chain, a belt, or rope so as to be rotatably disposed in the rear side of the main body 10, and a driving gear 14 fixed to the rotation shaft 13.

The driving gear 14 is constituted by a pair of right and left discs 14a fixed to the center of the rotation shaft 13 and a plurality of bar bodies 14b which are disposed in the circumferential direction of the pair of discs 14a so as to connect one disc to the other disc.

The front wheel assembly 20, which is disposed in the front side of the main body 10, is constituted by a front wheel cover 21, a front wheel frame 22 by which a plurality of guide rollers 22a are rotatably supported therein, and a front wheel 23 which is rotatably supported by the plurality of guide rollers 22a.

The front wheel cover 21 is mounted on the upper surface of the front wheel frame 22 so as to protect the upper surface of the front wheel 23, and the front wheel 23 is rotatably disposed on the outer circumferential surface of the front wheel frame 22 by the plurality of guide rollers 22a provided inside the front wheel frame 22. In addition, on the inner surface of the front wheel frame 22, a front stepping pedal 24 is provided, on which user's feet are placed.

The rear wheel assembly 30, which is disposed in the rear side of the main body 10, is constituted by a rear wheel cover 31, a rear wheel frame 32 by which a plurality of guide rollers 32a are rotatably supported therein, and a rear wheel 33 which is rotatably supported by the plurality of guide rollers 32a.

The rear wheel cover 31 is mounted on the upper surface of the rear wheel frame 32 so as to protect the upper surface of the rear wheel 33, and the rear wheel 33 is rotatably disposed on the outer circumferential surface of the rear wheel frame 32 so as to be freely rotated by the plurality of guide rollers 32a disposed to the rear wheel frame 32. In addition, to one side of the rear wheel frame 32, a rear stepping pedal 34 may be attached, on which user's feet are placed.

In addition, on the outer circumferential surface of the rear wheel 33, a plurality of grooves is formed to be separated from each other with a predetermined distance in the circumferential direction. The plurality of grooves 33a are constituted so that the driving gear 14 is rotatingly contacted with the respective bar bodies 14b to rotatably drive the rear wheel 33 directly.

Both left and right ends of the connection bar 41 are respectively fixed to the upper sides of the front wheel cover 21 and the rear wheel cover 31 so that the front wheel cover 21 and the rear wheel cover 31 are connected in the longitudinal direction of the main body 10.

The brake mechanism 60, which is disposed on the rotation shaft 13, is constituted by a brake disc 61 fixed to the rotation shaft 13 through a fastening hole or the like, and a caliper 62 which presses portions of the brake disc 61 at both sides to apply braking power to the rotation shaft 13.

Here, the caliper 62 is connected to a braking pedal 72 of the controller 70 through a flexible cable 71 extending from the controller 70 to be described below so that, a friction pad (not shown) provided in the caliper 62 presses portions of the brake disc 61 at both sides so as to brake the rotation shaft 13, based on a braking signal of the braking pedal 72.

The brake mechanism 60, which is substitutable, is constituted by a brake drum 61a fixed to the rotation shaft 13 and a drum brake 62a pressing portions of the brake drum at both sides so as to apply braking power to the rotation shaft.

As such, in the present invention, the brake mechanism 60 integrally disposed to the rotation shaft 13 applies increased braking power to the rotation shaft 13 on the declined road or at the time of stopping to perform a quick stop operation, thereby improving the safety.

Figure 1A:
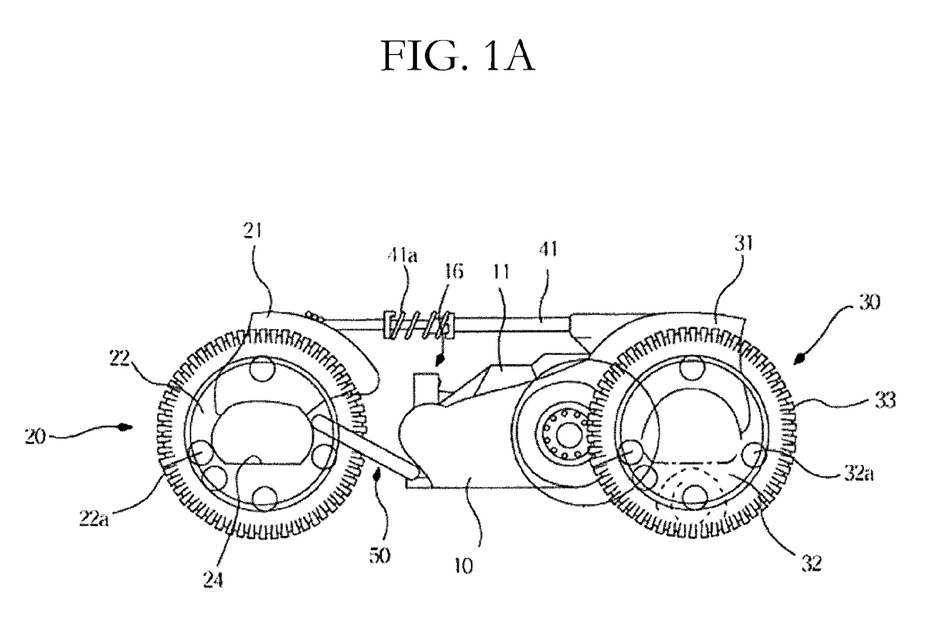
FIGS. 1A and 1B are a side view and a partial detailed drawing illustrating a motorbike according to one embodiment of the present invention.
Figure 1B:
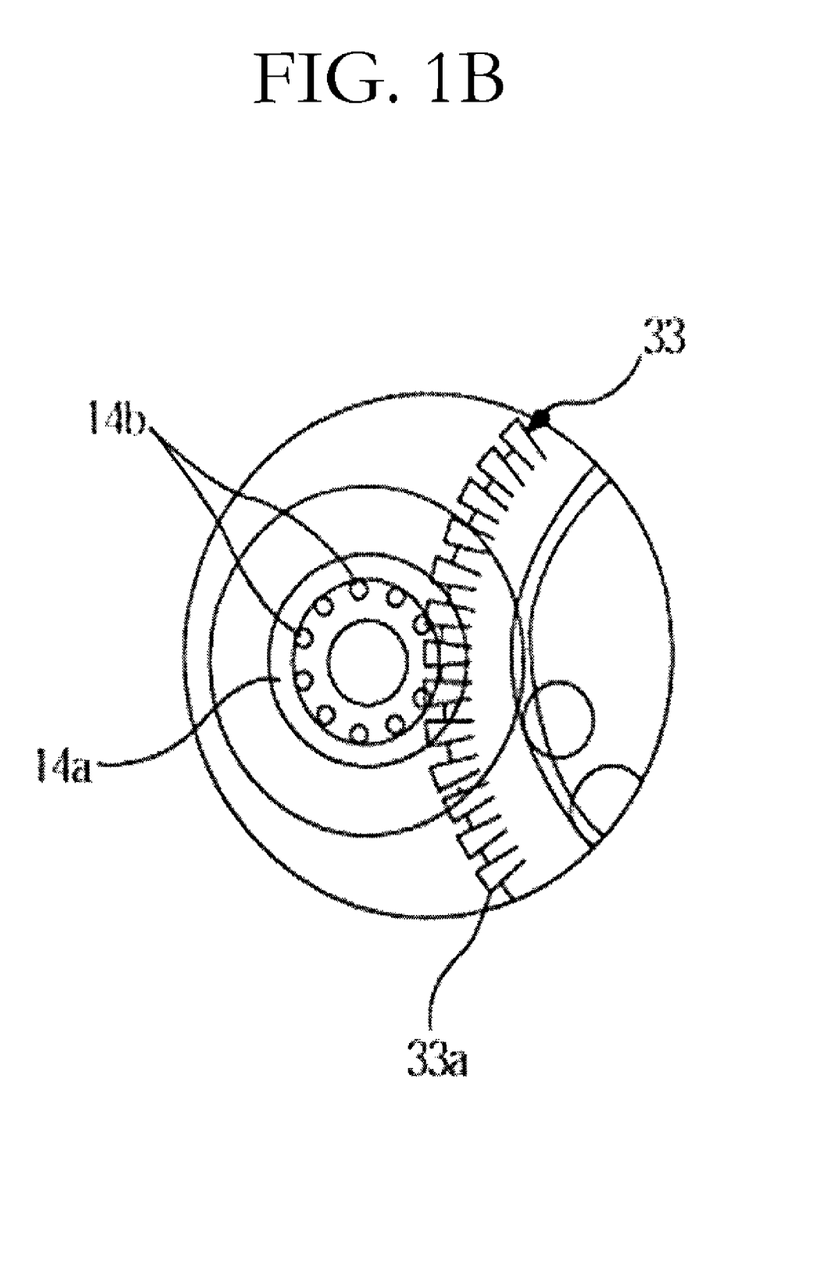
Figure 2A:
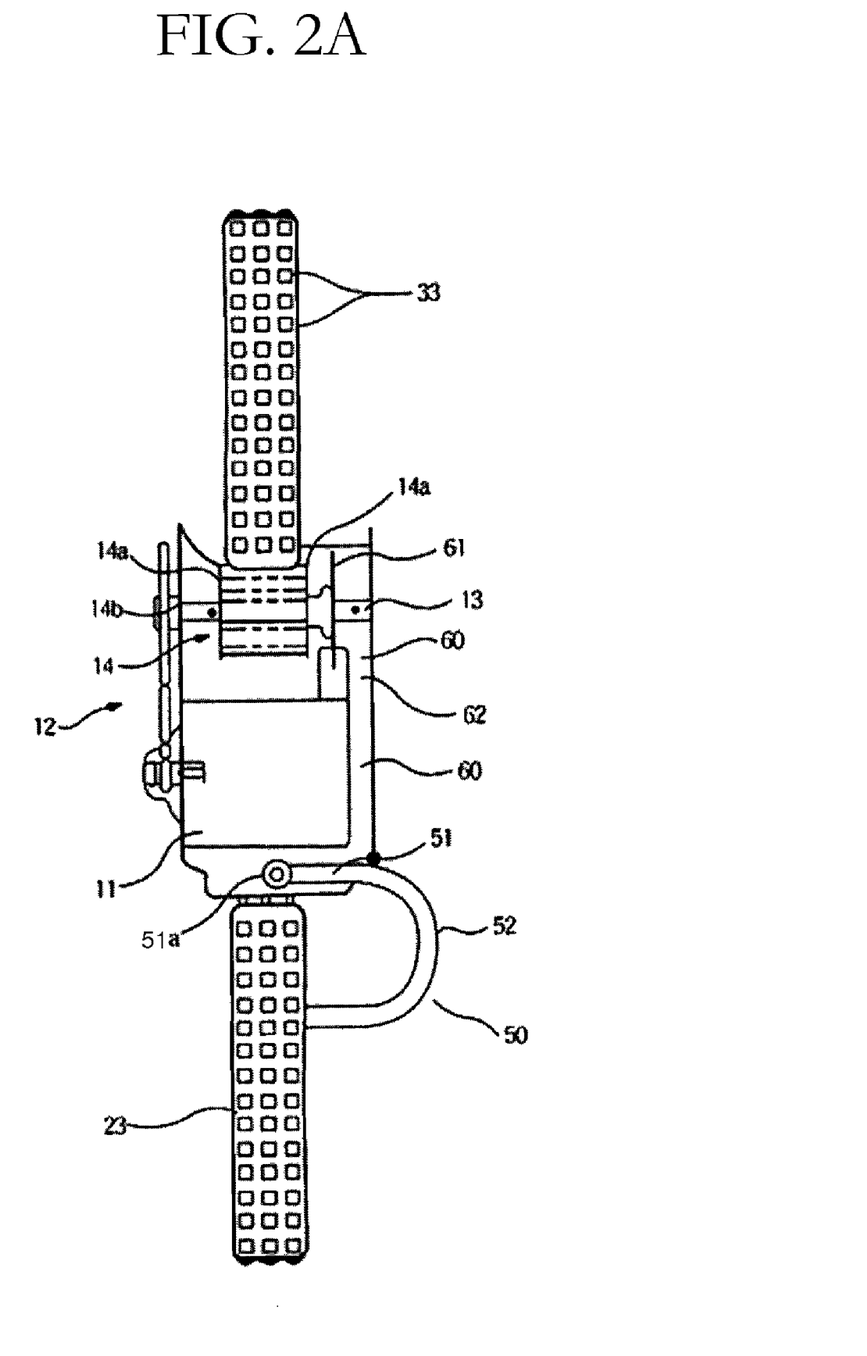
FIGS. 2A and 2B are a plan view illustrating the motorbike according to one embodiment of the present invention.
Figure 2B:
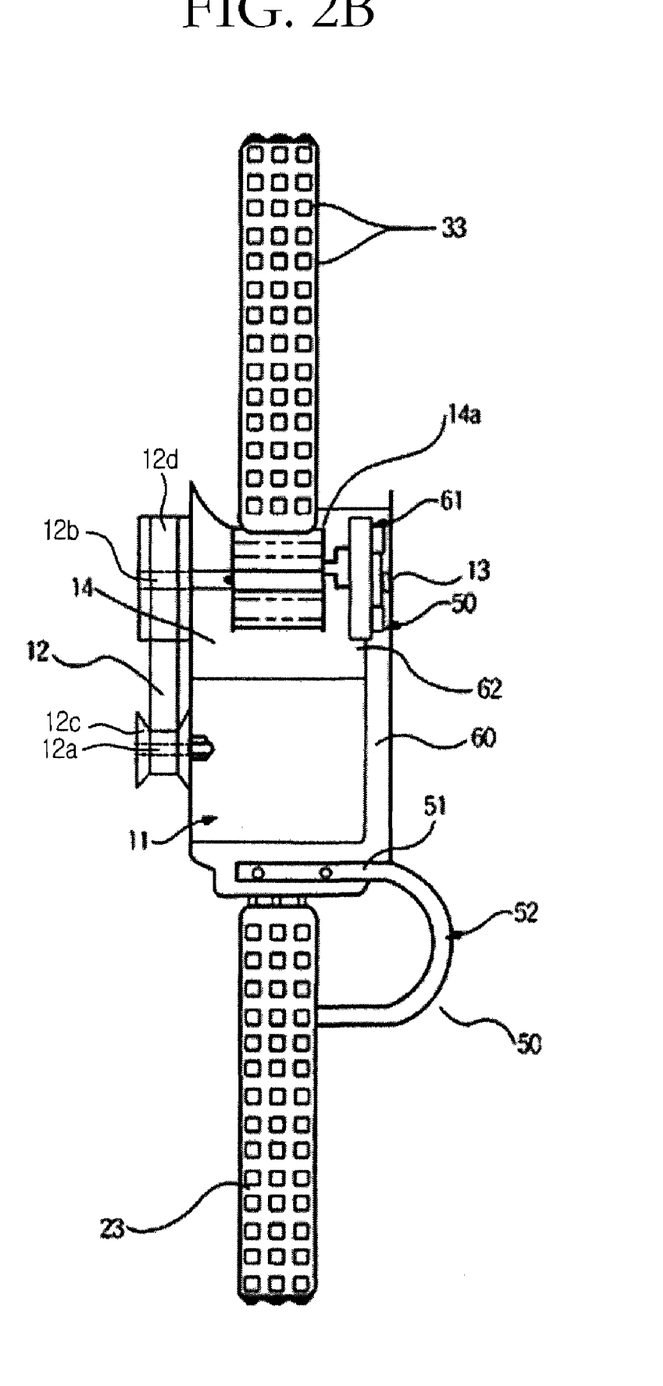
Figure 2C:
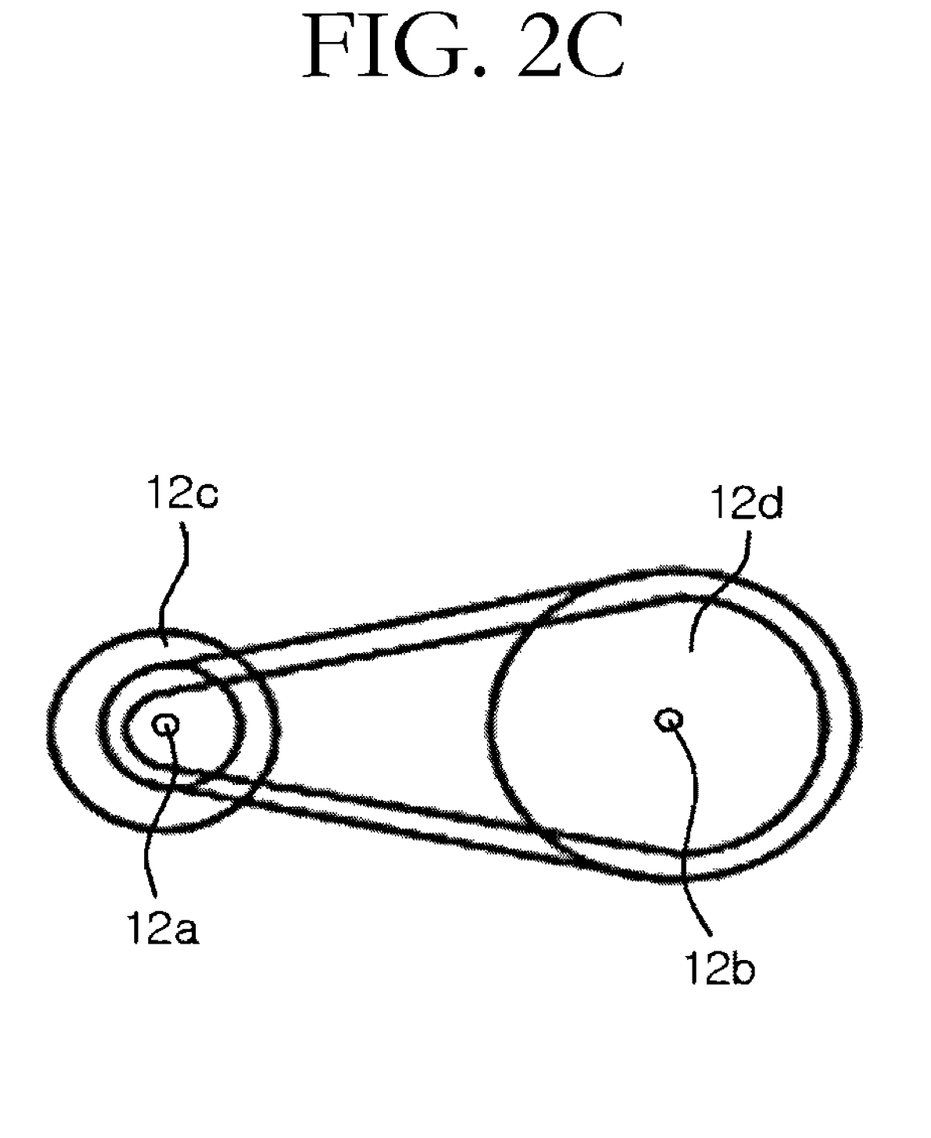
FIG. 2C shows a belt, a shaft and a pulley.

The output shaft 12a and a rear shaft 12b are connected through a chain and the belt 12 by the means of a sprocket, a pulley, a continuously variable transmission (CVT), or the like so as to effectively transmit the power of the engine 11 to the driving gear 14.

The continuously variable transmission (CVT) has the shape of a pulley, and the turning radius of the belt 12 changes depending on the speed, that is, at high speed or at low speed. When the speed is low, the turning radius of the belt 12 suspended to the first pulley 12c mounted on the output shaft 12a decreases and the turning radius of the belt 12 suspended to the second pulley 12d mounted on the rear shaft 12b increases. As the riding speed gets high, the turning radius of the belt 12 suspended to the output shaft 12a increases and the turning radius of the belt 12 suspended to the rear shaft 12b decreases. Therefore, when the speed is low, the torque output is improved, so that starting and traveling can be performed easily. When the speed is high, the power is effectively distributed, which makes it possible to travel at higher speed.

Figure 3:
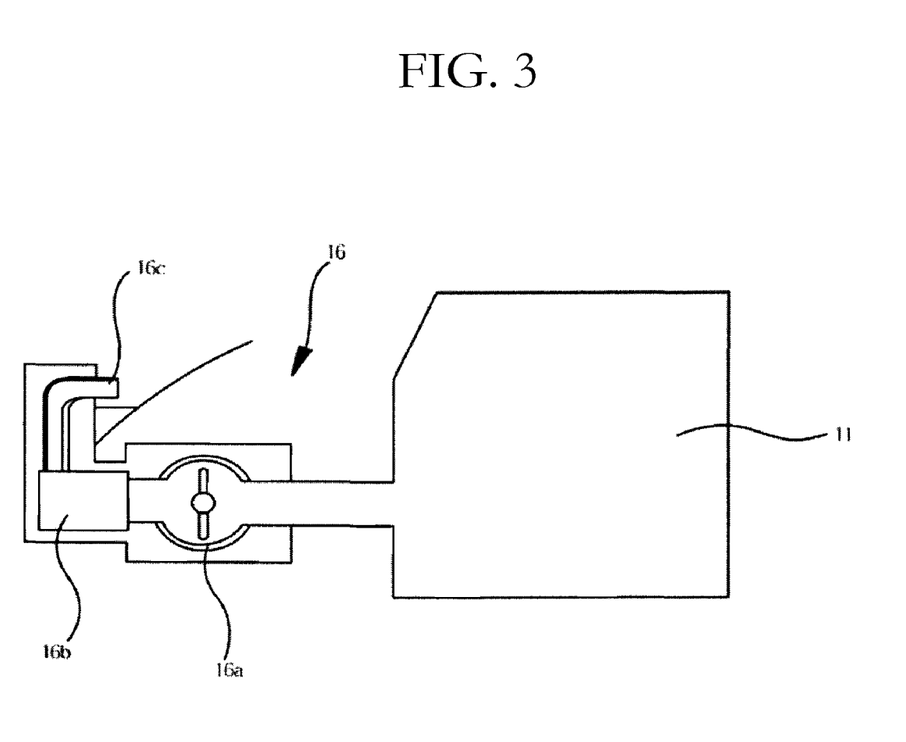
FIG. 3 is a cross-sectional view illustrating an inlet of the motorbike in accordance with one embodiment of the present invention.

The air suction section 16 is constituted by an air inlet 16c for sucking air from the outside to supply the air into the engine, a filter 16b which is disposed in the downstream side of the air inlet 16c so as to filter air to be sucked, and an adjusting damper 16a for adjusting the amount of air to be flowed in the engine 11.

Preferably, the air inlet 16c of the air suction section 16 is disposed to face the side of the rear wheel, so that various foreign matters contained in the air to be sucked can be prevented from flowing in.

Figure 4A:
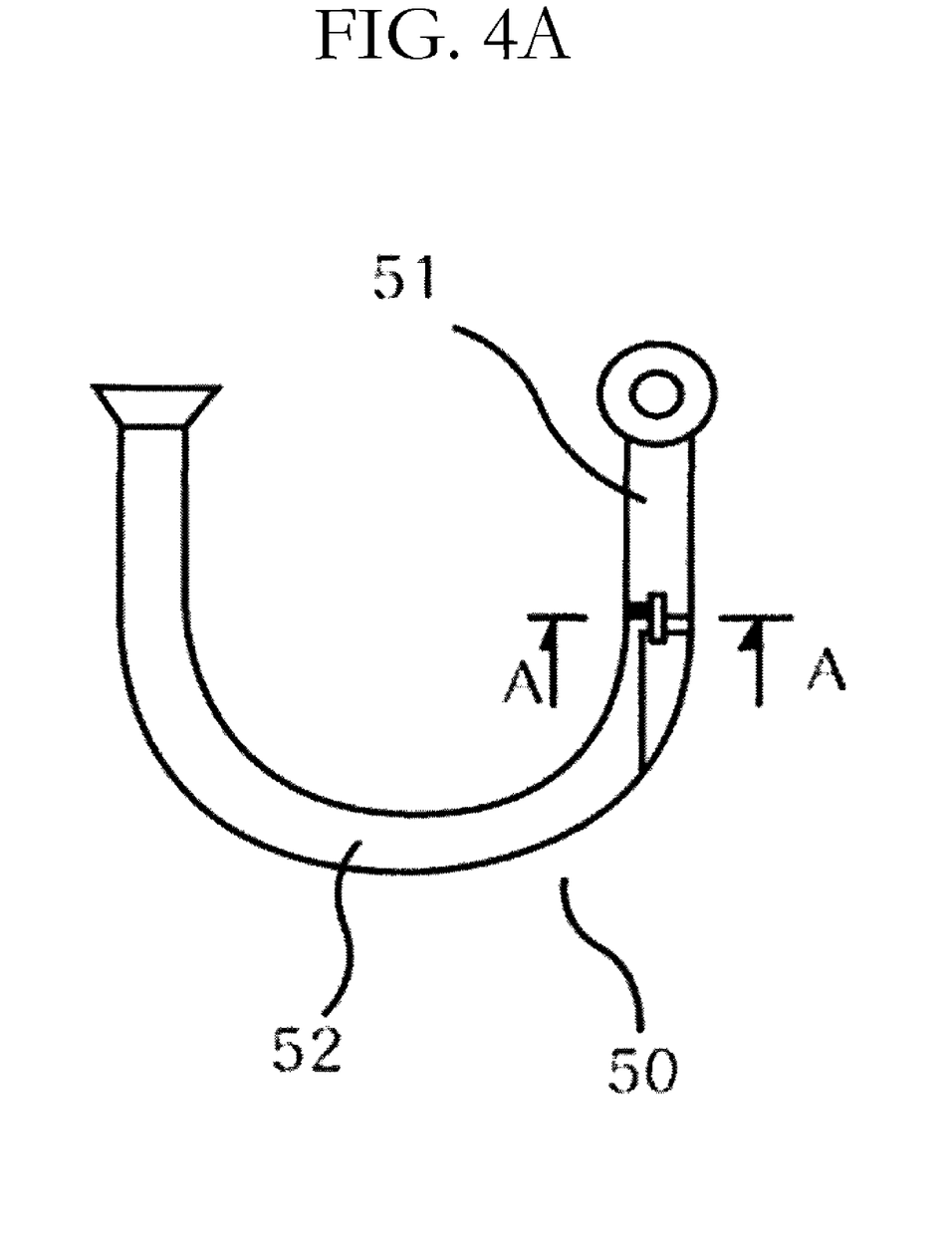
FIGS. 4A and 4B are a plan view illustrating a structure of a connection link of the motorbike in accordance with one embodiment of the present invention and a cross-sectional view illustrating the structure taken along line A-A.
Figure 4B:
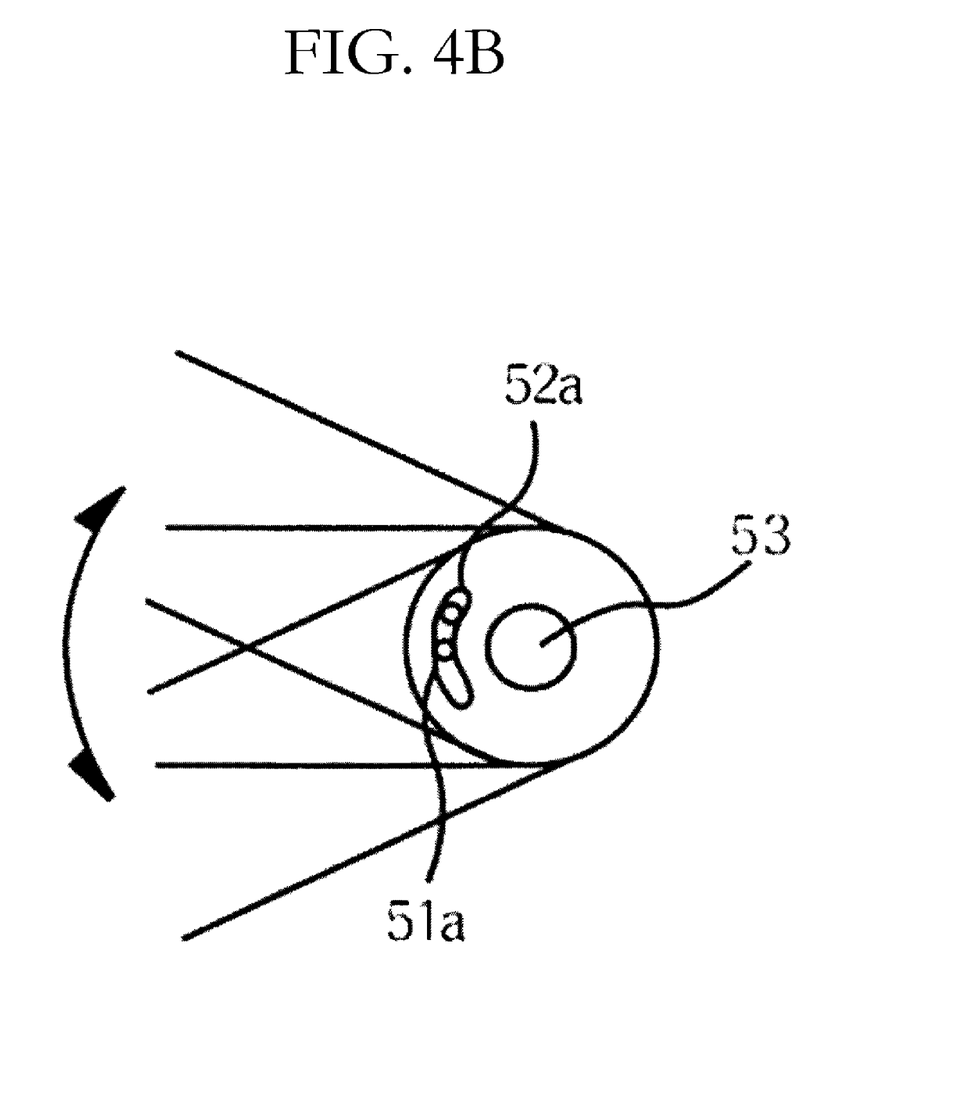

The connection link 50, through which the front wheel frame 22 is flexibly connected to the front side of the main body 10, is constituted by a first connection link 51 and a second connection link 52. One end of the first connection link 51 is joined to the front side of the main body 10, and one end of the second connection link 52 is joined to one side of the front wheel frame 22.

The other ends of the first connection link 51 and the second connection link 52 are connected so as to relatively turn in the vertical direction about each other. The other ends of the first connection link 51 and the second connection link 52 are hinge-joined by a hinge pin 53 so as to be brought into rotational contact with each other. On the other ends of the first and the second connection links 51 and 52, which are adjacent to each other, a guide groove 52a formed at a predetermined rotation angle and a guide projection 51a to be guided by the guide groove 52a are provided so as to correspond to each other.

In the connection link 50 through which the front wheel frame 20 and the main body 10 are connected, the first and the second connection links 51 and 52 relatively turn in the vertical direction about each other, so that shock-absorption and flexibility are improved when the motorbike is driven.

Figure 5:
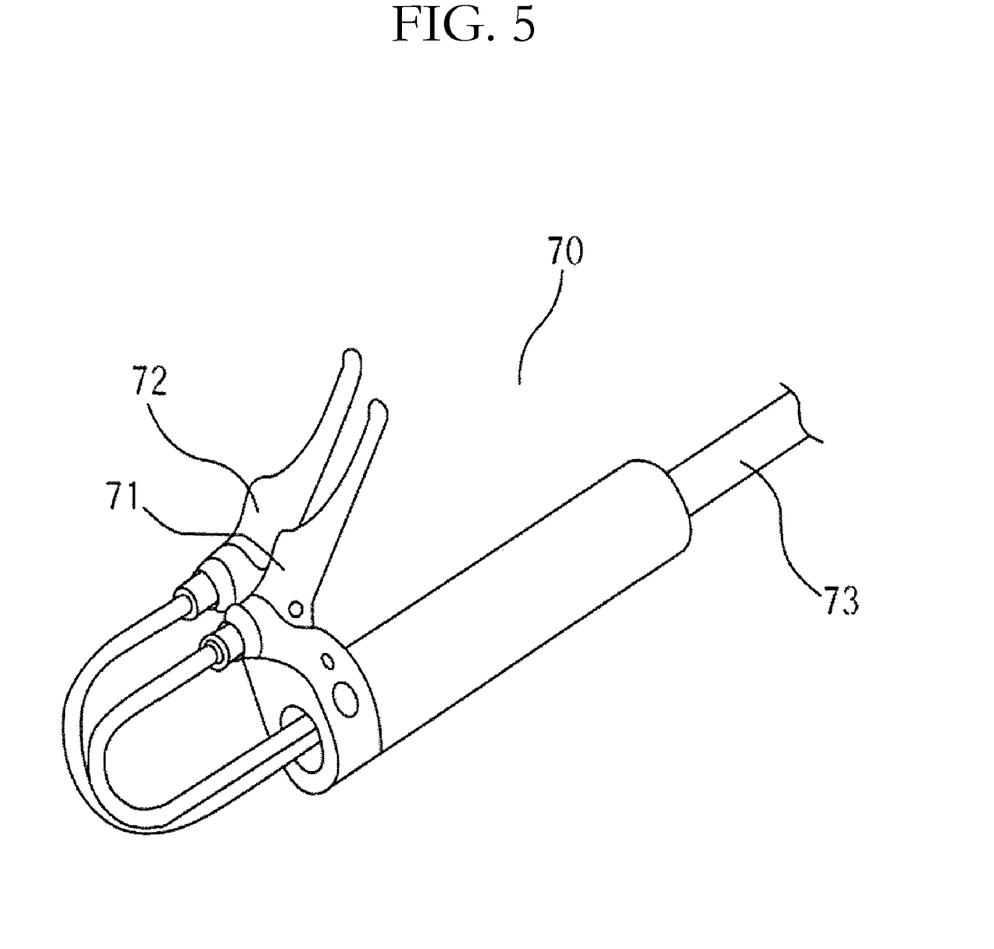
FIG. 5 is a partial perspective view illustrating a controller of the motorbike in accordance with one embodiment of the present invention.

The controller 70 includes an acceleration pedal 71 and a braking pedal 72. The acceleration pedal 71 is connected to the engine 11 through the flexible cable 73 so as to control driving of the engine 11. The braking pedal 72 is connected to the brake mechanism 60 through the flexible cable 73 so as to control braking of the rotation shaft 13. The acceleration pedal 71 and the braking pedal 72 are rotatingly hinge-joined to the controller 70.

Since the controller 70 has a structure where the acceleration pedal 71 and the braking pedal 72 are hinge-joined so as to turn in the same direction at the end thereof, a user can operate the controller 70 with one hand. Therefore, the speed of the motor board can be easily regulated, and a stop operation can be easily performed. Further, there can be provided a controller where an acceleration pedal and a braking pedal are hinge-joined to be opposed to each other at both ends.

As described above, the present invention has the following features. The driving force of the engine is directly transmitted to the rear wheel of the rear wheel assembly, which is referred to as 'the direct driving of the rear wheel'. Therefore, the driving force can be enhanced, and power waste can be minimized. In addition, operability of the braking is drastically improved, so that the safety, when in use, is improved.

In addition, the present invention has the following advantage. With flexibility and shock absorption enhanced, riding quality is improved, and other various requirements can be satisfied.

Until now, the specific preferred embodiment of the present invention has been drawn and described. However, the present invention is not limited thereto, and it will be understood by those skilled in the art that various changes in form and details may be made therein without departing from the scope of the present invention.

The invention claimed is:

1. A motorbike, comprising:

a main body that has an engine mounted therein, a rotation shaft which is connected to an output shaft of the engine through a transmission so as to be rotatably disposed in the rear side, and a driving gear constituted by a pair of right and left discs fixed to the rotation shaft and a plurality of bar bodies which are disposed in the circumferential direction of the pair of discs so as to connect one disc to the other disc;

a front wheel assembly that is disposed in the front side of the main body to be constituted by a front wheel cover, a front wheel frame by which a plurality of guide rollers are rotatably supported therein, and a front wheel which is rotatably supported by the plurality of guide rollers;

a rear wheel assembly that is disposed in the rear side of the main body to be constituted by a rear wheel cover, a rear wheel frame by which a plurality of guide rollers are rotatably supported therein, and a rear wheel which is rotatably supported by the plurality of guide rollers;

front and rear stepping pedals provided in the front and rear assemblies;

a connection bar through which the rear wheel cover and the front wheel cover is connected in the longitudinal direction;

a connection link through which the front wheel frame is connected to the lower portion of the main body;

a brake mechanism that is fixed to the rotation shaft of the main body; and a controller that is connected to the engine and the brake mechanism through a flexible cable and in which an acceleration pedal and a braking pedal for controlling driving of the engine and braking of the rear wheel shaft, respectively, are rotatably hinge-joined, wherein, on the outer circumferential surface of the rear wheel, a plurality of grooves are formed in a circumferential direction to correspond to the outer circumferential surfaces of the bar bodies of the driving gear, and the grooves of the rear wheel and the bar bodies are brought into rotational contact with each other so that the rear wheel is rotatingly driven.

2. The motorbike according to claim 1, wherein the brake mechanism fixed to the rotation shaft of the main body is constituted by a brake disc and a caliper which presses portions of the brake disc to apply braking power.

3. The motorbike according to claim 1, wherein the brake mechanism includes a brake drum fixed to the rotation shaft and a drum brake which presses portions of the brake drum to apply braking power.

4. The motorbike according to claim 1, further comprising:

a first pulley mounted on the output shaft of the engine; and a second pulley mounted on the rear shaft parallel to the output shaft, wherein the driving gear is realized by use of a CVT system where the effective diameter of the first pulley is changed from a small one to a large one by the rotation and, corresponding to the change, the effective diameter of the second pulley is changed.

5. The motorbike according to claim 1, further comprising:

a shock-absorbing spring member that is disposed on the shaft of the connection bar so as to provide a shock-absorbing force in the shaft direction of the connection bar.

6. The motorbike according to claim 1, further comprising:
an air suction section including an air inlet for sucking air from the outside to supply the air to the engine, a filter which is disposed in the downstream side of the air inlet to filter air to be sucked, and an adjusting damper for adjusting an amount of air to be flowed in the engine.

7. The motorbike according to claim 1, wherein, in the connection link constituted by a first and a second connection link, one end of the first connection link is joined to the lower side of the main body,
one end of the second connection link is joined to the frame of the front wheel assembly,
the other ends of the first and the second connection link, which are adjacent to each other, are hinge-joined to each other so that the concentric portions thereof turn, and
on the other ends of the first and the second connection links, which are adjacent to each other, a guide groove formed at a predetermined rotation angle and a guide projection to be guided into the guide groove are provided so as to correspond to each other.

* * * * *